Sept. 14, 1943.   H. J. HENSEN   2,329,535
HOSE CLAMP TOOL
Filed March 31, 1942   2 Sheets-Sheet 1
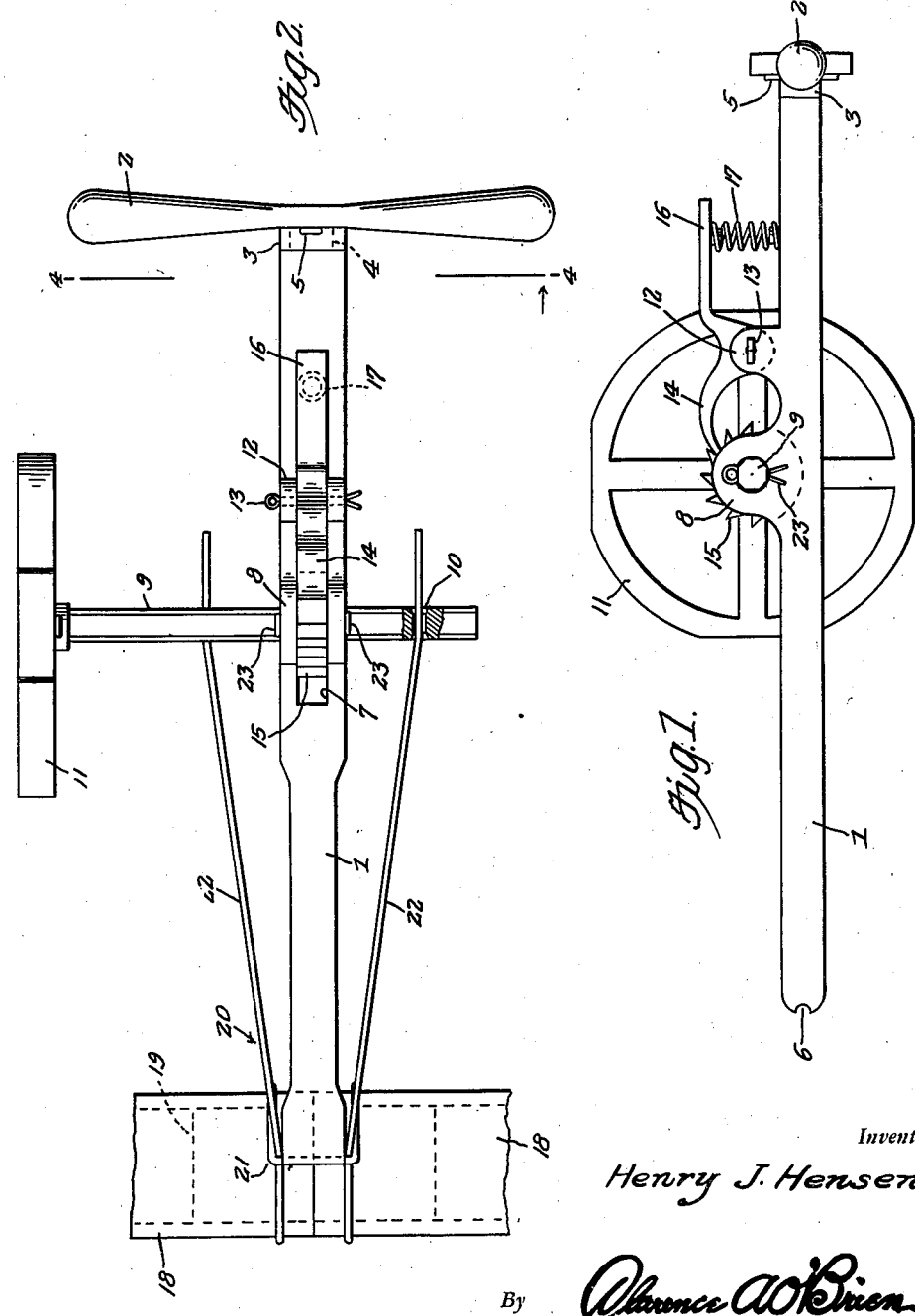
Inventor
Henry J. Hensen
By Clarence A. O'Brien
and Harvey B. Jacobson
Attorneys

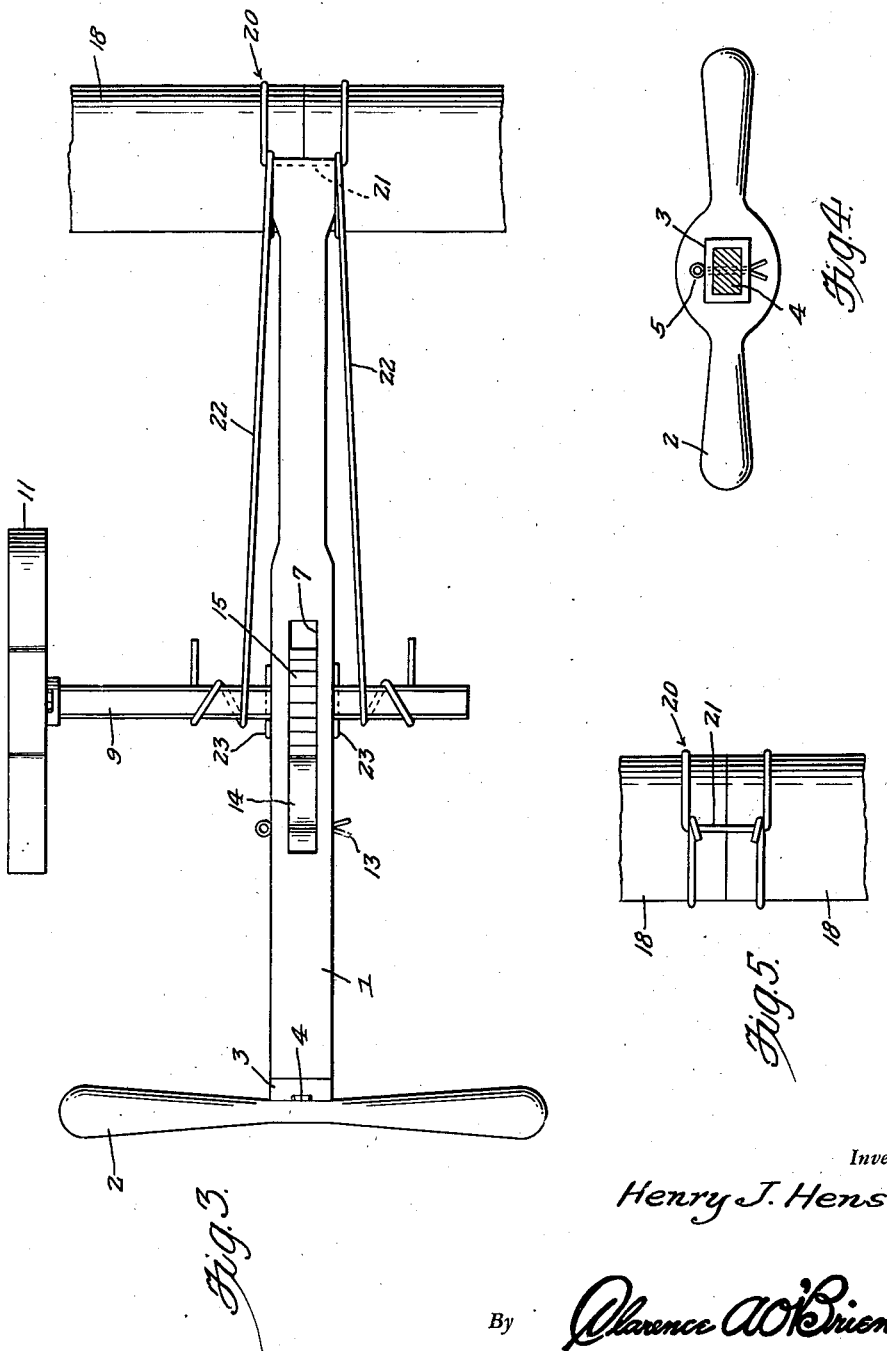

Patented Sept. 14, 1943

2,329,535

UNITED STATES PATENT OFFICE 2,329,535

HOSE CLAMP TOOL

Henry J. Hensen, Susanville, Calif.

Application March 31, 1942, Serial No. 437,080

1 Claim. (Cl. 81—9.3)

The present invention relates to new and useful improvements in hose clamp tools, and has for its primary object to provide, in a manner as hereinafter set forth, a device of this character comprising novel means for drawing wire clamps tightly around various sizes of hose within a given range.

Another very important object of the invention is to provide a tool of the aforementioned character which is adapted to function satisfactorily on any suitable wire.

Other objects of the invention are to provide a hose clamp tool which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a hose clamp tool constructed in accordance with the present invention.

Figure 2 is a plan view with a portion broken away in section, showing the tool at the start of the clamp tightening operation.

Figure 3 is a plan view, showing the tool after the clamp tightening operation has been completed.

Figure 4 is a cross sectional view, taken substantially on line 4—4 of Figure 2.

Figure 5 is a plan view, showing the completed clamp securing two end portions of a hose to a coupling.

Referring now to the drawings in detail, it will be seen that the embodiment of the invention which has been illustrated comprises a bar 1 of suitable material. Mounted on one end portion of the bar 1 is a handle 2. The handle 2 is provided with a substantially rectangular socket 3 for the reception of the reduced, correspondingly shaped end portion 4 of the bar 1. A pin 5 secures the handle 2 to the bar 1. The other end portion of the bar 1 is rounded off and provided with a transverse groove 6, the purpose of which will be presently set forth.

At an intermediate point, the bar 1 has formed therein a longitudinal slot 7. Rising from this portion of the bar 1, on opposite sides of the slot 7, are integral bearings 8. A winding shaft 9 of suitable material is journaled, at an intermediate point, in the bearings 8. On opposite sides of the bar 1 the winding shaft 9 has formed therein openings 10. Fixed on one end portion of the shaft 9 is an operating wheel 11.

Also rising from the bar 1, at a point between the bearings 8 and the handle 2 and adjacent the former, is a pair of integral ears 12. Journaled on a suitable pin 13 between the ears 12 is a pawl 14. The pawl 14 is engageable with a ratchet wheel 15 which is fixed on the shaft 9 between the bearings 8 for releasably securing said shaft against retrograde rotation. Projecting rearwardly from the pivoted end of the pawl 14 is a thumb lever 16 beneath which a coil spring 17 is engaged for yieldingly urging said pawl into engagement with the ratchet 15.

Reference numeral 18 designates the end portions of a pair of hose which are connected by a suitable nipple or the like 19. A clamp for securing this connection is indicated at 20. The clamp 20 is formed from a length of suitable wire which is bent upon itself in a manner to provide a bight portion 21 and legs 22.

It is thought that the manner of using the device will be readily apparent from a consideration of the foregoing. Briefly, the clamp 20 is wrapped around the hose and the legs 22 are inserted through the bight portion 21 of said clamp. The grooved end 6 of the bar 1 is then engaged with the bight portion 21 of the clamp 20 and the end portions of the legs 22 of said clamp are inserted through the openings 10 in the shaft 9. The shaft 9 is then rotated through the medium of the wheel 11 for winding the end portions of the legs 22 thereon thereby tightenng the clamp about the hose. The bar 1 is then swung upwardly, as viewed in Figure 2 of the drawings, for further tightening the clamp and the shaft 9 is given a final turn for completing the tightening operation. Swinging movement of the bar 1 in the same direction is then continued for causing the grooved end 6 of said bar to disengage itself from the bight portion 21 of the clamp 20. The legs 22 are then cut off at a point adjacent the bight 21 of the clamp 20 and the remaining end portions are pounded downwardly and inwardly in the manner shown in Figure 5 of the drawings. This completes the operation. Cotter pins 23 secure the shaft 9 against longitudinal movement in the bearings 8.

It is believed that the many advantages of a hose clamp tool constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A tightening tool for wire hose clamps of the type including a bight portion and end portions passing through said bight portion, comprising a substantially straight metallic bar engageable, at one end, with the bight portion of the clamp between the end portions thereof, said one end of the bar having a transverse groove therein for the reception of the clamp, a transverse handle fixed on the other end of the bar, a pair of spaced, transversely aligned bearings rising from the bar at an intermediate point, a transverse shaft journaled, at an intermediate point, in the bearings, pins in the shaft on the outer sides of the bearings for retaining the shaft against sliding movement therein, said shaft having openings therein on opposite sides of the bar for receiving the end portions of the clamp, a hand wheel fixed on one end portion of the shaft for actuating same for winding the end portions of the clamp thereon, a ratchet wheel fixed on the shaft between the bearings, a pair of ears rising from the bar between the bearings and the handle, and a spring pressed pawl pivotally mounted between said bearings and engageable with the ratchet wheel for releasably securing the shaft against retrograde rotation, said pawl including manual actuating means extending adjacent the handle and operable therefrom for disengaging said pawl from the ratchet wheel.

HENRY J. HENSEN.